United States Patent
Nakamura et al.

(10) Patent No.: US 7,002,883 B2
(45) Date of Patent: Feb. 21, 2006

(54) DISK-SHAPED STORAGE MEDIUM AND TRACKING METHOD USING THE SAME

(75) Inventors: Tadashi Nakamura, Katano (JP); Yasumori Hino, Ikoma (JP); Norio Miyatake, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 340 days.

(21) Appl. No.: 10/639,191

(22) Filed: Aug. 11, 2003

(65) Prior Publication Data

US 2004/0047279 A1 Mar. 11, 2004

Related U.S. Application Data

(62) Division of application No. 09/647,283, filed as application No. PCT/JP00/00434 on Jan. 27, 2000, now Pat. No. 6,628,578.

(30) Foreign Application Priority Data

| Jan. 29, 1999 | (JP) | ................... 11-021884 |
| Jan. 29, 1999 | (JP) | ................... 11-021885 |

(51) Int. Cl.
G11B 5/09 (2006.01)
G11B 7/24 (2006.01)

(52) U.S. Cl. .................. 369/47.22; 369/275.3

(58) Field of Classification Search ............ 369/47.19, 369/47.21, 47.22, 47.27, 275.3, 275.4, 59.25
See application file for complete search history.

(56) References Cited

U.S. PATENT DOCUMENTS

| 5,233,592 | A |   | 8/1993  | Suzuki et al. |           |
| 5,867,474 | A |   | 2/1999  | Nagasawa et al. |         |
| 5,872,767 | A |   | 2/1999  | Nagai et al. |            |
| 5,878,007 | A |   | 3/1999  | Matsumoto et al. |        |
| 5,896,365 | A |   | 4/1999  | Hiroki |                  |
| 5,933,410 | A | * | 8/1999  | Nakane et al. ........... 369/275.3 |
| 6,064,644 | A | * | 5/2000  | Miyamoto et al. ....... 369/275.4 |
| 6,069,870 | A | * | 5/2000  | Maeda et al. ............ 369/275.3 |
| 6,172,960 | B1 |  | 1/2001  | Takemura et al. |         |
| 6,208,603 | B1 | * | 3/2001 | Ishida et al. ............. 369/59.25 |
| 6,310,838 | B1 | * | 10/2001| Heemskerk et al. ..... 369/275.3 |
| 6,418,104 | B1 |  | 7/2002  | Sato et al. |             |

FOREIGN PATENT DOCUMENTS

| EP | 0 740 291 | 10/1996 |
| EP | 0 896 325 | 2/1999  |
| EP | 0 926 664 | 6/1999  |
| JP | 2-177027  | 7/1990  |
| JP | 3-189962  | 8/1991  |
| JP | 7-57302   | 3/1995  |
| JP | 8-87777   | 4/1996  |

(Continued)

*Primary Examiner*—Thang V. Tran
(74) *Attorney, Agent, or Firm*—Hamre, Schumann, Mueller & Larson, P.C.

(57) ABSTRACT

A disk-shaped storage medium allowing the redundancy of an address part to be reduced and data to be recorded with a higher density, and a tracking method using the same are provided. In a disk-shaped storage medium in which a track is divided into a plurality of areas and address data are positioned in the plurality of areas, error detection codes are added to data common to adjacent tracks of the address data for identifying the data common to adjacent tracks. This enables the synchronous process to data in reproducing the address data to be carried out without using a unique synchronization pattern.

2 Claims, 13 Drawing Sheets

FOREIGN PATENT DOCUMENTS

| | | |
|---|---|---|
| JP | 9-27153 | 1/1997 |
| JP | 9-138948 | 5/1997 |
| JP | 9-161274 | 6/1997 |
| JP | 9-185826 | 7/1997 |
| JP | 9-231579 | 9/1997 |
| JP | 9-251639 | 9/1997 |

* cited by examiner ( a )

( b )

DISK-SHAPED STORAGE MEDIUM AND TRACKING METHOD USING THE SAME

This application is a divisional of application Ser. No. 09/647,283, filed Sep. 26, 2000 now U.S. Pat. No. 6,628,578, which is a National Stage Application of PCT/ JP00/00434 filed Jan. 27, 2000, which application(s) are incorporated herein by reference.

TECHNICAL FIELD

The present invention relates to a disk-shaped storage medium on or from which data is recorded or reproduced using a laser beam, and to a tracking method using the disk-shaped storage medium.

BACKGROUND ART

Recently, as disk-shaped storage media, optical disks have been put into practical use as large capacity data files and media for storing music or images. However, it further is intended to increase the capacities of such disk-shaped storage media so that they can be applied in more various uses. For efficient access to a large capacity optical disk, the following method is employed in general. That is, recording data are distributed to sectors in a certain unit of data size, and recording and reproduction are performed using the sectors as base units for rewriting. To the respective sectors as the base units for rewriting, addresses for identifying the sectors are added. Generally, the addresses are recorded as pits formed of concave and convex parts in an optical disk. A land/groove recording system has been employed commonly. In the system, track-guide grooves and inter-groove portions are used as areas for recording data in order to increase the density in a track direction.

A conventional optical disk having this sector configuration is described with reference to FIG. 12.

In FIG. 12(*a*), numeral 1001 indicates a substrate, numeral 1002 a recording film, numeral 1003 a first track, numeral 1004 a second track, numeral 1005 a sector of a divided portion of the track, numeral 1006 an address for identifying the sector, and numeral 1007 a data recording area for recording data. The first track 1003 is formed of a groove and the second track 1004 is formed of an inter-groove portion sandwiched by the groove of the first track. As shown in FIG. 12(*a*), the first track 1003 and the second track 1004 are configured to be positioned alternately on a one-revolution basis. Tracking by an optical beam is performed using the groove as a guide. However, the first track 1003 is in the groove and the second track 1004 is on the inter-groove portion, and therefore a tracking polarity is required to be inverted for the shift between the first track and the second track. As marks serving for detecting the polarity inversion, polarity inversion marks 1008 are provided in locations where the shift between the first track and the second track takes place. An optical disk device inverts the polarity in tracking using the polarity inversion marks 1008. In the sector 1005, the address 1006 and the data recording area 1007 are arranged as shown in FIG. 12(*b*).

Furthermore, as shown in FIG. 12(*c*), the address 1006 added for identifying the sector 1005 includes a sector mark 1009 indicating a sector starting point, a VFO mark 1010 used for generating a clock for the reproduction of the address part, an address mark 1011 for indicating the start of address data, a sector number 1012, a track number 1013, and an error detection code 1014. Since the sector mark 1009 and the address mark 1011 provide a data pattern for identifying the start of the address data, the data pattern is required to be a unique pattern that does not appear in the sector number 1012, the track number 1013, and the error detection code 1014. Therefore, the address data of the sector number 1012, the track number 1013, and the error detection code 1014 are recorded after being processed by bi-phase modulation or run-length-limiting modulation (RLL modulation). By this modulation process, a data pattern that does not appear from modulation rules for the other data can be obtained. Thus, a unique data pattern not in accordance with the modulation rules is used for the sector mark 1009 and the address mark 1011. The sector mark 1009 has a sufficient length to identify the start of the address area easily even when a PLL clock for synchronization is not locked.

As the modulation to the address data portion, the conventional example shown in FIG. 12 employs a bi-phase modulation in which "0" is modulated to be "00" or "11", and "1" to be "10" or "01". According to this modulation, a pattern with at least three "1" or "0" in a row is changed into a unique pattern not in accordance with the modulation rules. As the pattern not in accordance with the modulation rules, the conventional example shown in FIG. 12 employs "10001110" for the address mark 1011 and "111111110000000" for the sector mark 1009. A method of reproducing the address part in this conventional example is described briefly as follows.

Initially, the sector mark is detected. The sector mark has a unique pattern having eight "1" and eight "0" consecutively. When a mark with at least a certain length is detected using a free-running PLL clock, the sector mark 1009 can be detected easily. When this sector mark 1009 is detected, the PLL clock used for address demodulation is locked by the subsequent VFO 1010. After the lock of the PLL clock, the PLL clock determines "1" and "0" of the reproduced data, thus obtaining determination data. When the pattern of "10001110" as the address mark 1011 is detected from the determination data, the subsequent data are identified as the sector number 1012, the track number 1013, and the error detection code 1014. In this way, the detection of the address mark 1011 allows the subsequent data to be identified as the sector number 1012, the track number 1013, and the error detection code 1014 that are to be demodulated. Thus, the data are demodulated.

In the above-mentioned conventional example, the address part 1006 includes the VFO mark 1010 for clock synchronization. However, a method in which the clock for demodulating address data is obtained by another means also has been practiced. This type of conventional example is described with reference to FIG. 13.

In FIG. 13(*a*), numeral 1101 indicates a substrate, numeral 1102 a recording film, numeral 1103 a track, numeral 1104 a sector of a divided portion of the track, numeral 1105 a segment of a divided portion of the sector, numeral 1106 an address for identifying the sector, and numeral 1107 a data recording area for recording data.

As shown in FIG. 13(*b*), in the leading location of the segment 1105, wobble pits 1108 used for obtaining a tracking signal and the subsequent clock pit 1109 for generating a clock for address and data demodulation are provided. As shown in FIG. 13(*c*), the address 1106 added to identify the sector 1104 includes an address mark 1110 for indicating the start of the address data, a sector number 1111, a track number 1112, and an error detection code 1113. As in the above-mentioned conventional example, the address mark 1110 has a unique pattern that does not appear in the sector number 1111, the track number 1112, and the error detection code 1113. Similarly in the conventional example shown in FIG. 13, the bi-phase modulation is employed for modulating the address data portion and "10001110" is used as the address mark 1110 as in the above-mentioned conventional example.

A method of reproducing the address part in this conventional example is described briefly as follows. Initially, the clock pit 1109 is detected. Using this clock pit, the frequency of a clock pit detection signal is multiplied by N using the PLL, thus generating a PLL clock for address demodulation. In the trailing part of the PLL clock, as in the above-mentioned conventional example, "1" and "0" of the reproduced data are determined, thus obtaining determination data. When the pattern of "10001110" as the address mark 1110 is detected from this determination data, the subsequent data are identified as the sector number 1111, the track number 1112, and the error detection code 1113. In this way, the detection of the address mark 1110 allows the subsequent data to be identified as the sector number 1111, the track number 1112, and the error detection code 1113 that are to be demodulated. Thus, the data are demodulated.

In a conventional optical disk, however, a unique pattern that does not appear in an address data portion has been required as an address mark to identify the starting position of an address. Therefore, recording was performed after the process of the data portion of the address by the bi-phase or RLL modulation. In a 1–7 modulation or 2–7 modulation as a type of bi-phase modulation or RLL modulation, one bit of address data becomes two bits or 1.5 bits after the modulation, thus increasing redundancy. Therefore, there has been a problem that the area required for the address data portion increases and thus the data recording area is reduced.

Moreover, in a conventional magneto-optical disk, in order to reproduce the first track and the second track continuously, a detection pit for tracking polarity inversion is provided, which also has been a factor that reduces the area in or from which data are recorded or reproduced. Furthermore, in the case of using one bit of the polarity inversion detection pit, it has been difficult to secure sufficient reliability with respect to defects of the disk and damages on the disk surface.

DISCLOSURE OF THE INVENTION

The present invention is intended to solve the aforementioned problems and to provide an optical disk in which the redundancy of an address part is reduced to enable high density information recording, and a tracking method using such an optical disk.

In order to achieve the above-mentioned object, a first disk-shaped storage medium according to the present invention includes a track divided into a plurality of areas and in the plurality of areas, address data are positioned. Error detection codes are added to data common to adjacent tracks of the address data for identifying the data common to adjacent tracks. According to this configuration, an effect can be obtained in that a synchronous process can be performed on data in address data reproduction without using a unique synchronization pattern.

In the first disk-shaped storage medium, it is preferable that the data common to adjacent tracks are positioned at a track pitch allowing the data common to adjacent tracks to be reproduced either on the track or in locations sandwiched by the track. This enables information useful for control to be read out from the optical disk without tracking control.

In order to achieve the above-mentioned object, a second disk-shaped storage medium according to the present invention has two tracks having different tracking polarities and being positioned alternately on a one-revolution basis. The tracks are divided into a plurality of areas and address data are positioned in the plurality of areas. Error detection codes are added to data common to adjacent tracks of the address data for identifying the data common to adjacent tracks. The data common to adjacent tracks include circumferential position information and are positioned at a track pitch allowing the data common to adjacent tracks to be reproduced either on the tracks or in locations sandwiched by the track. According to this configuration, the data common to adjacent tracks and the error detection codes for identifying the data common to adjacent tracks are read out without tracking control. Based on them, the switching of the tracking polarities can be detected.

In the first and second disk-shaped storage media, it is preferable that the address data are distributed to be positioned in the plurality of areas as one bit each. According to this, it is not necessary to accelerate a shift register storing the data common to adjacent tracks and the error detection codes identifying the data common to adjacent tracks in order to identify them in address data reproduction. Thus, the synchronous process to data can be performed easily.

In the second disk-shaped storage medium, it is preferable that the two tracks having different tracking polarities and being positioned alternately on a one-revolution are formed of tracks subjected to the tracking control by pairs of wobble marks positioned in locations in the plurality of areas into which the tracks are divided. The locations are shifted to the left and right with respect to the centers of the tracks and are spaced at a certain distance in a track-running direction. Respective positions of the wobble marks as a pair are changed alternately on the one-revolution basis. According to this, the tracking control is performed while the positions of the wobble marks, i.e. the polarities of tracking error signals are switched every revolution. Consequently, the track pitch can be reduced to increase the density of the tracks, while the one-spiral track configuration advantageous in continuously recording and reproducing mass data is maintained.

In order to achieve the above-mentioned object, a tracking method according to the present invention is characterized by the following. A disk-shaped storage medium is used. In the disk-shaped storage medium, two tracks with different tracking polarities are divided into a plurality of areas. Address data are positioned in parts of the plurality of areas. Error codes are added to data common to adjacent tracks of the address data for identifying the common data. The common data include circumferential position information and are positioned at a track pitch allowing the common data to be reproduced both on the tracks and between the tracks. Using this disk-shaped storage medium, starting points of the address data are detected based on the common data and the error detection codes. From the starting points, the circumferential position information is detected and the tracking polarities are determined from the position information. Thus, tracking control is performed. This method enables the switching of the tracking polarities to be detected easily.

In the first disk-shaped storage medium, it is preferable that pits producing the timings for demodulation of the address are positioned at a track pitch allowing the pits to be reproduced either on the track or in locations sandwiched by the track.

In order to achieve the above-mentioned object, an address reproduction method according to the present invention is characterized by the following. A disk-shaped storage medium is used. In the storage medium, a track formed of a groove and an inter-groove portion or of an inter-groove portion alone is divided into a plurality of areas. In the plurality of areas, address data are positioned. Using this storage medium, reference positions for producing the timings for demodulation of the address data are produced from the starting ends or the trailing ends of the grooves of the track divided into the plurality of areas.

In the first disk-shaped storage medium, it is preferable that the track is formed of a groove or an inter-groove portion and is divided into a plurality of areas and the address data are distributed to be positioned in the plurality of areas as one bit each at the positions of starting ends or trailing ends of the grooves divided into the plurality of areas.

In the first disk-shaped storage medium, it is preferable that the track is formed of a groove or an inter-groove portion and is divided into a plurality of areas and the address data are distributed to be positioned in the plurality of areas as one bit each at the positions of the starting ends of the grooves divided into the plurality of areas and the trailing ends of the grooves divided into the plurality of areas are aligned to be arranged at radially corresponding positions.

According to the above-mentioned configuration and methods, in order to identify the starting position of the address, it is not required to modulate the address data portion and to use a unique pattern obtained by the modulation rules as address marks. Therefore, the redundancy of the address part can be reduced considerably, thus achieving a high-density optical disk.

In the optical disk of the present invention, the positions where the tracking polarities are switched can be detected before a tracking pull-in operation. Therefore, in an optical disk with a track pitch providing a high-density track, a stable tracking pull-in operation can be performed.

Furthermore, the tracking control performed according to the signals from the wobble pits while recording and reproduction are performed only in groove portions enables the track pitch to be reduced and the difference in the recording/reproduction characteristics between tracks to be eliminated simultaneously.

BEST MODE FOR CARRYING OUT THE INVENTION

Embodiments of the present invention are described with reference to the drawings as follows.

First Embodiment

Figure 1:
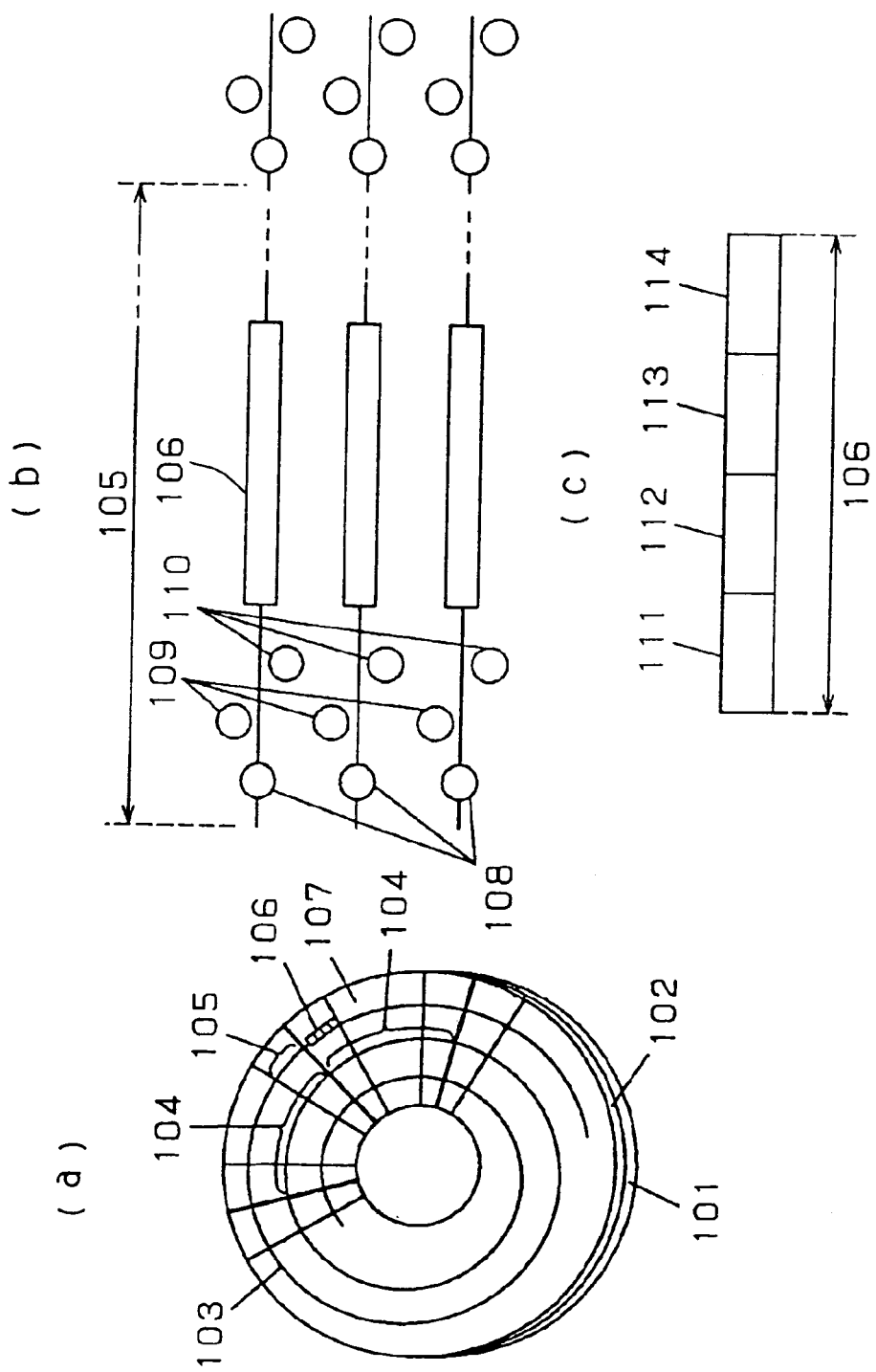
FIGS. 1(a), 1(b), and 1(c) are a general structural drawing, a drawing of a segment structure, and a drawing illustrating an address area, respectively, of an optical disk according to a first embodiment of the present invention.

FIGS. 1(a), 1(b), and 1(c) show a general structural drawing, a drawing of a segment structure, and a drawing illustrating an address area, respectively, of an optical disk according to a first embodiment of the present invention.

In FIG. 1(a), numeral 101 indicates a substrate, numeral 102 a recording film, numeral 103 a track, numeral 104 a sector of a divided portion of the track, numeral 105 a segment of a divided portion of the sector, numeral 106 an address for identifying the sector, and numeral 107 a data recording area for recording data. The track 103 is divided into 32 sectors 104 around the disk. Further, the sector 104 is divided into 40 segments 105, and the address 106 is recorded in the first segment.

As shown in FIG. 1(b), in the leading location of the segment 105, a clock pit 108 for generating a clock and wobble pits 109 and 110 used for obtaining a tracking signal are provided. A tracking system in the present embodiment is a sample servo system in which tracking is performed by allowing quantities of reflected lights from the wobble pits 109 and 110 to be equal.

As shown in FIG. 1(c), the address 106 added to identify the sector 104 includes an 8-bit sector number 111, an error detection code 112 for identifying the sector number, a 16-bit track number 113, and an address-data error detection code 114. It is one of the important characteristics of the present invention to employ an address format in which the error detection code 112 for identifying a data common to adjacent tracks is added to the data (the sector number 111 in the present embodiment) common to adjacent tracks. By using this error detection code 112, the synchronous process to the address data can be carried out. In the present embodiment, an 8-bit CRC error detection code is used as the error detection code 112 for the sector number and a 14-bit CRC error detection code as the error detection code 114 for the address number. With respect to the address data 111, 112, 113, and 114, no modulation such as bi-phase modulation or the like, which has been carried out conventionally, is performed, and the address data are recorded as a bit string of "1" and "0".

The data bits required when such address data are recorded by the conventional system in which data are recorded after being subjected to bi-phase modulation are 8 bits (an address mark)+16 bits (the sector number after the bi-phase modulation)+32 bits (the track number after the bi-phase modulation)+28 bits (the address-data error detection code after the bi-phase modulation)=84 bits. On the other hand, in the optical disk of the present invention, the address data are recorded without a modulation process such as the bi-phase modulation. Therefore, the bits required for the address part can be reduced considerably compared to that in the conventional system and are 8 bits (the sector number)+8 bits (the sector-number error detection code)+16 bits (the track number)+14 bits (the address-data error detection code)=46 bits. When the address is demodulated in such an optical disk, the synchronous process to demodulation data substituted for the conventional address mark is required. This method is described as follows.

Figure 2:
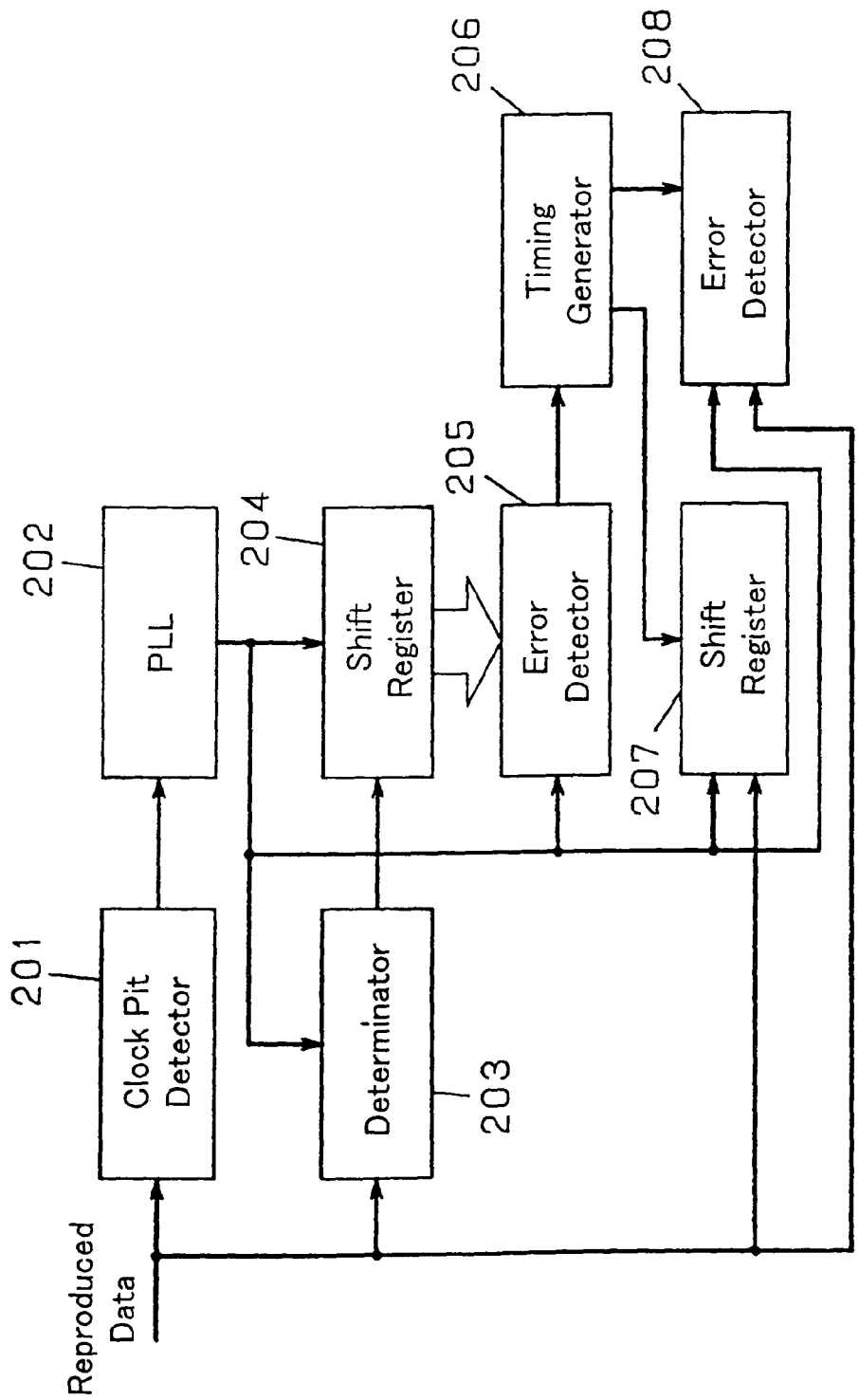
FIG. 2 is a block diagram of an address demodulator in the case of using the optical disk according to the first embodiment of the present invention.
Figure 3:
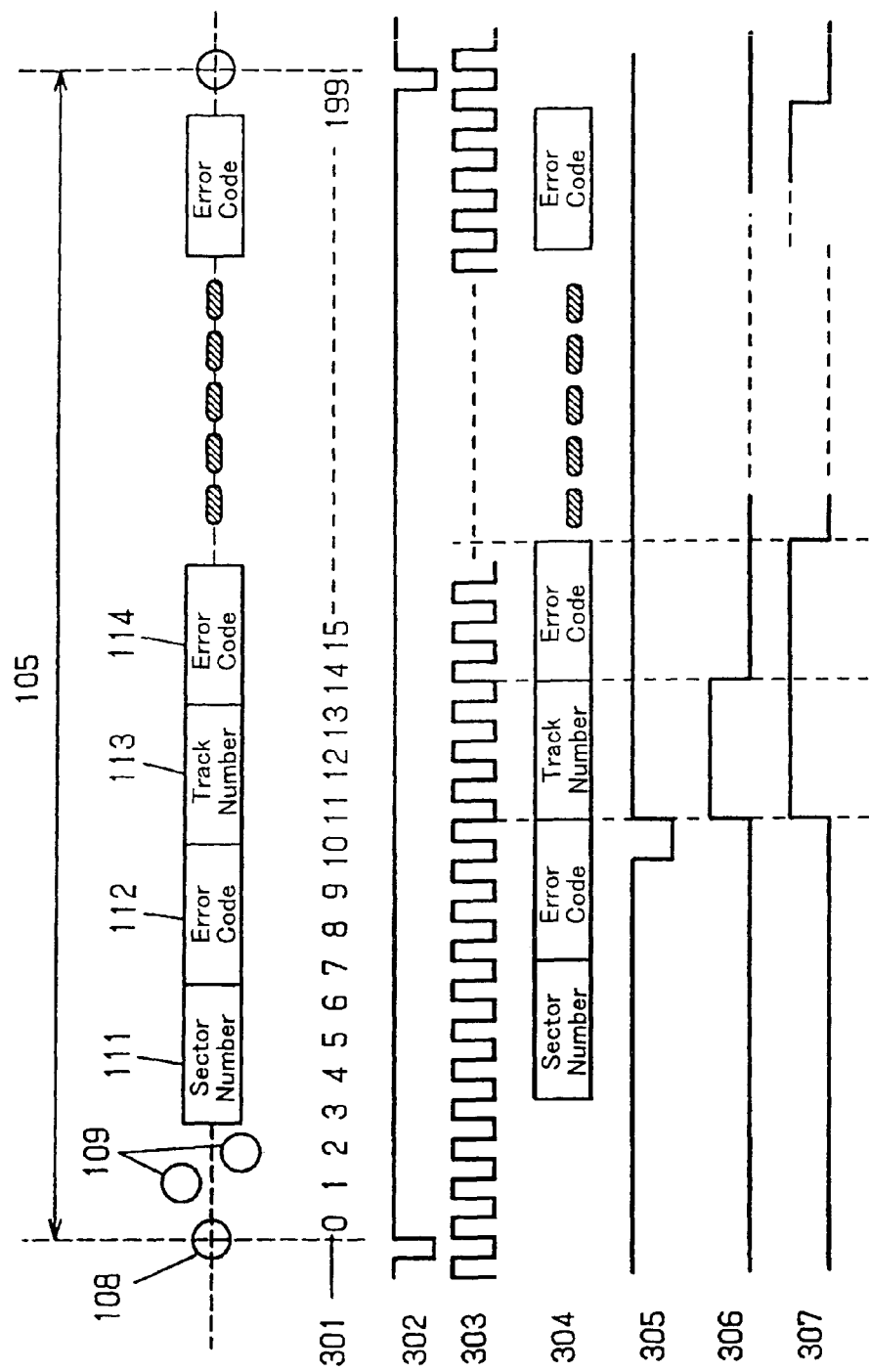
FIG. 3 is a diagram illustrating an operation of address demodulation in the case of using the optical disk according to the first embodiment of the present invention.

FIG. 2 is a block diagram of an address demodulator for demodulating the address 106 using the optical disk according to the present embodiment. FIG. 3 is a timing chart of the address demodulator. A method of reproducing the address 106 in the optical disk according to the present embodiment is described with reference to FIGS. 2 and 3.

In FIG. 2, numeral 201 indicates a clock pit detector, numeral 202 a PLL for generating a clock for address demodulation from a clock pit, numeral 203 a determinator for determining "1" and "0" of the address data in the trailing section of the PLL clock, numeral 204 a 16-bit shift register capable of storing an 8-bit sector number 111 and an 8-bit sector-number error detection code 112, numeral 205 a CRC error detector for detecting an error in contents of the shift register 204, numeral 206 a timing generator for generating demodulation timings for the track number 113 and the address-data error detection code 114, numeral 207 a shift register preserving the track number, and numeral 208 a CRC error detector for detecting an error in the address data.

Initially, it is necessary to generate a reference clock for demodulating the address. The reference clock is generated based on the clock pit 108. In the present embodiment, as indicated with numeral 301 in FIG. 3, there are 200 address data bits between the clock pit 108 at the leading end of the segment 105 and the clock pit 108 at the leading end of the subsequent segment. When based on a clock pit signal 302 detected by the clock pit detector 201, a clock with a frequency 200 times higher than that of the clock pit signal 302 is generated by the PLL 202, a clock 303 synchronized with the address data bits can be obtained. At the trailing end of the PLL clock 303, "1" and "0" are determined by the determinator 203, thus obtaining demodulation data 304. This demodulation data 304 is read by the shift register 204 and an error in contents of the shift register 204 is determined by the error detector 205.

Figure 4:
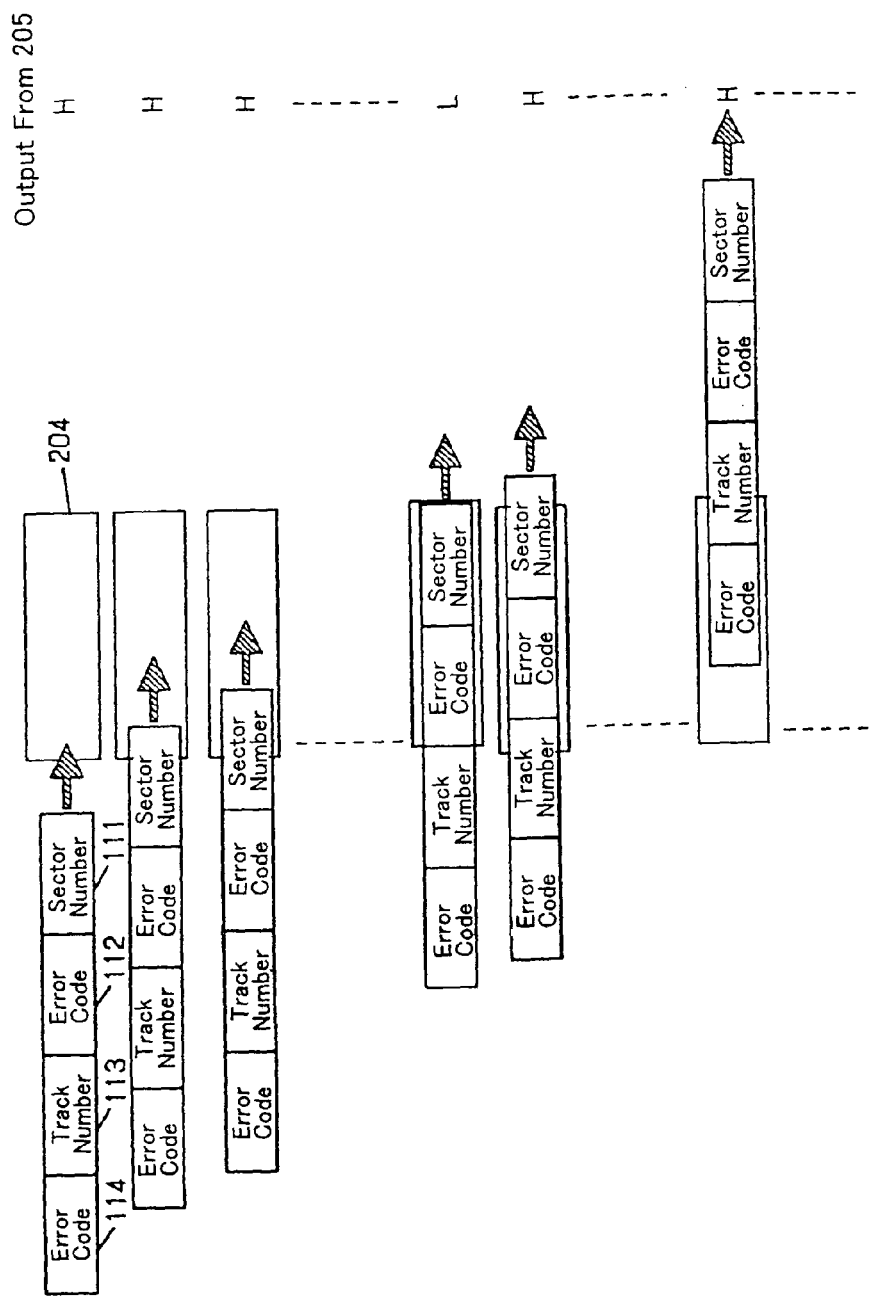
FIG. 4 is a diagram illustrating a synchronous process in address demodulation in the case of using the optical disk according to the first embodiment of the present invention.

FIG. 4 shows an operation of the shift register 204 and the error detector 205. As shown in FIG. 4, the CRC error of the sector number does not occur only when the whole sector number 111 and sector-number error detection code 112 are loaded on the shift register 204. In this case, an output 305 from the error detector 205 is 0. In other words, by detecting errors in the sector number 111 and the error detection code 112 accompanying the sector number, the position where no error occurs is determined uniquely. Therefore, the address data can be synchronized without using an address mark code. From the output 305 of the error detector 205, timing signals 306 and 307 (see FIG. 3) for operating the shift register 207 for the track number and the address-data error detector 208 can be generated by the timing generator 206. When the shift register 207 storing the track number and the error detector 208 are operated based on the timing signals 306 and 307, the address can be demodulated.

As described above, by the addition of an error detection code to a data common to adjacent tracks, the address part can be demodulated without modulating the address data. Thus, the redundancy of the address part can be reduced considerably.

Second Embodiment

FIGS. 5(a), 5(b), and 5(c) show a general structure, a segment structure, and an address area, respectively, of an optical disk according to a second embodiment of the present invention.

In FIG. 5(a), numeral 501 denotes a substrate, numeral 502 a recording film, numeral 503 a first track, numeral 504 a second track, numeral 505 a sector of a divided portion of the track, numeral 506 a segment of a divided portion of the sector, numeral 507 an address for identifying the sector, and numeral 508 a data recording area for recording data. The first track 503 and the second track 504 are divided into 32 sectors 505 around the disk. The sector 505 further is divided into 40 segments 506. The address 507 is recorded in the first segment. The other second to fortieth segments serve as the data recording area 508.

As shown in FIG. 5(b), in the leading location of the segment 506, a clock pit 509 for generating a clock and a pair of wobble pits 510 and 511 used for obtaining a tracking signal are provided. The tracking system in the present embodiment also is a sample servo system as in the first embodiment. In the present embodiment, in order to increase the density in a track direction, the first track 503 and the second track 504 having different tracking polarities in the sample servo system are positioned alternately on a one-revolution basis.

Figure 6:
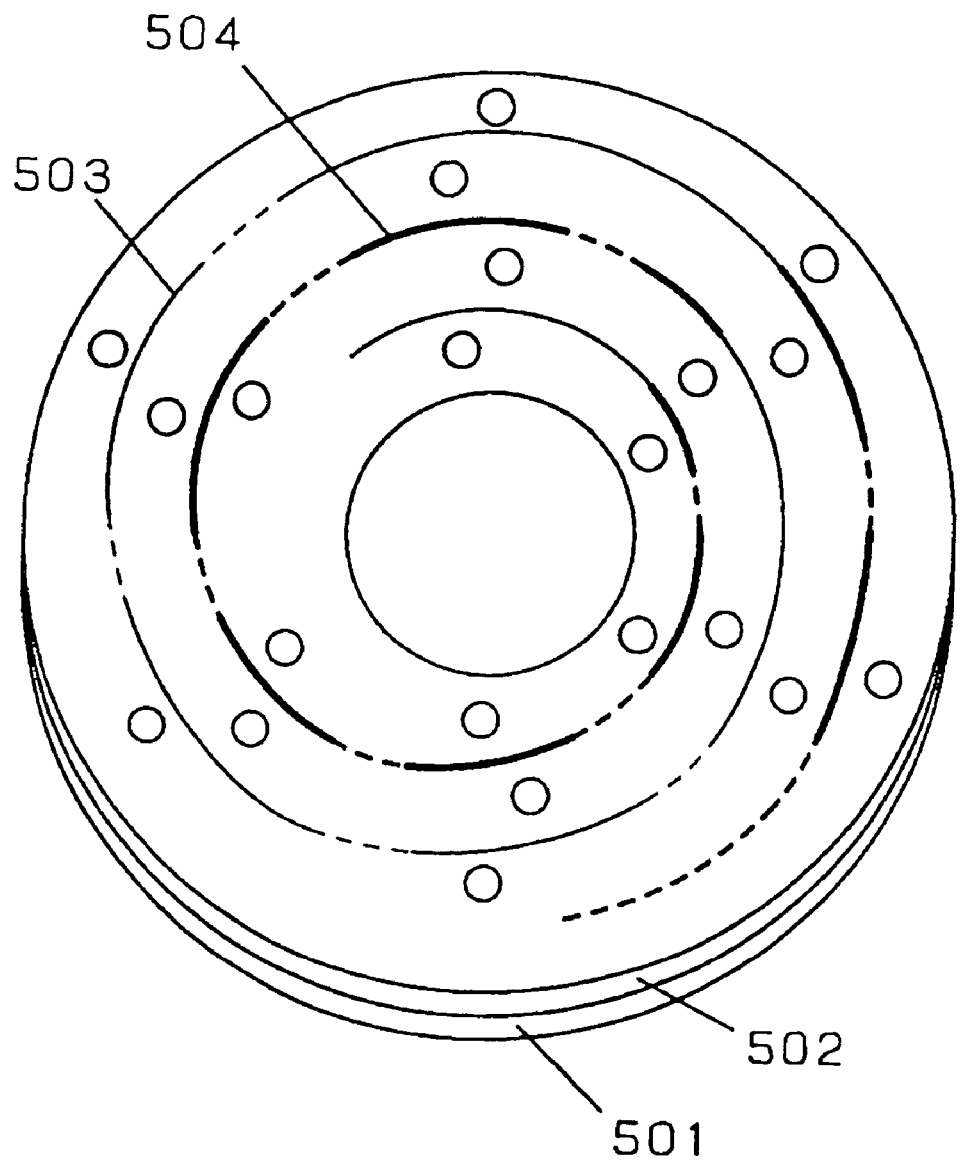
FIG. 6 is a drawing illustrating a tracking configuration of the optical disk according to the second embodiment of the present invention.

FIG. 6 shows the position relationship of the wobble pits 510 and 511 to the first track 503 and the second track 504. As shown in FIG. 6, the first track 503 and the second track 504 are configured spirally and continuously while being positioned alternately on a one-revolution basis in the disk (hereinafter, referred to as "a single-spiral polarity switching type sample servo system"). However, between the first track 503 and the second track 504, the positions of the wobble pits 510 and 511 are different and therefore the tracking polarity is inverted. Thus, two positive and negative polarity positions of the tracking signals are used, thus achieving a track pitch allowing the track density to be doubled. For the continuous recording and reproduction with respect to an optical disk with such a track configuration, it is necessary to invert the tracking polarity every revolution of the disk.

Figure 12:
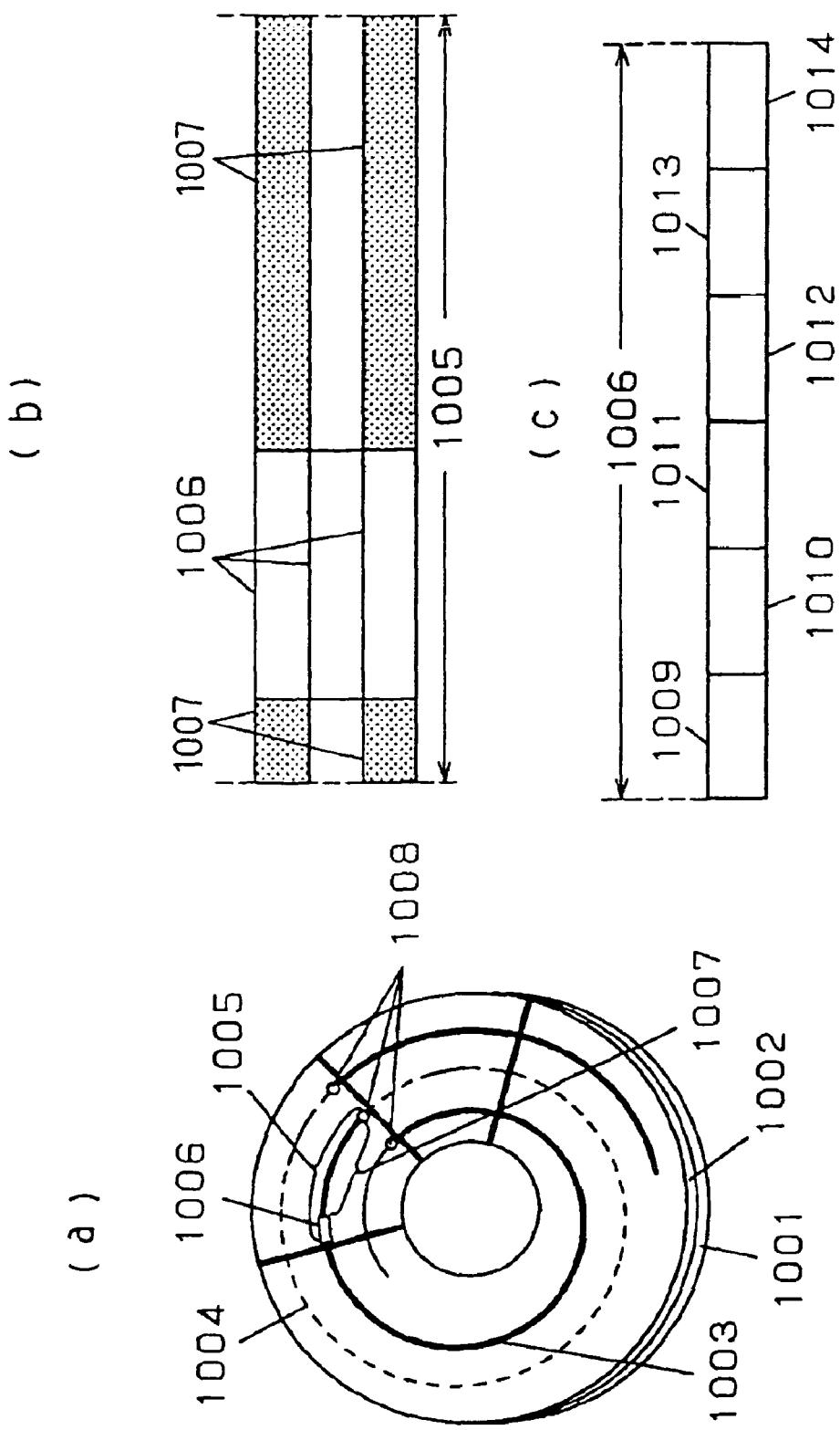
FIGS. 12(a), 12(b), and 12(c) are a general structural drawing, a drawing of a segment structure, and a drawing illustrating an address area, respectively, of a conventional optical disk.
Figure 13:
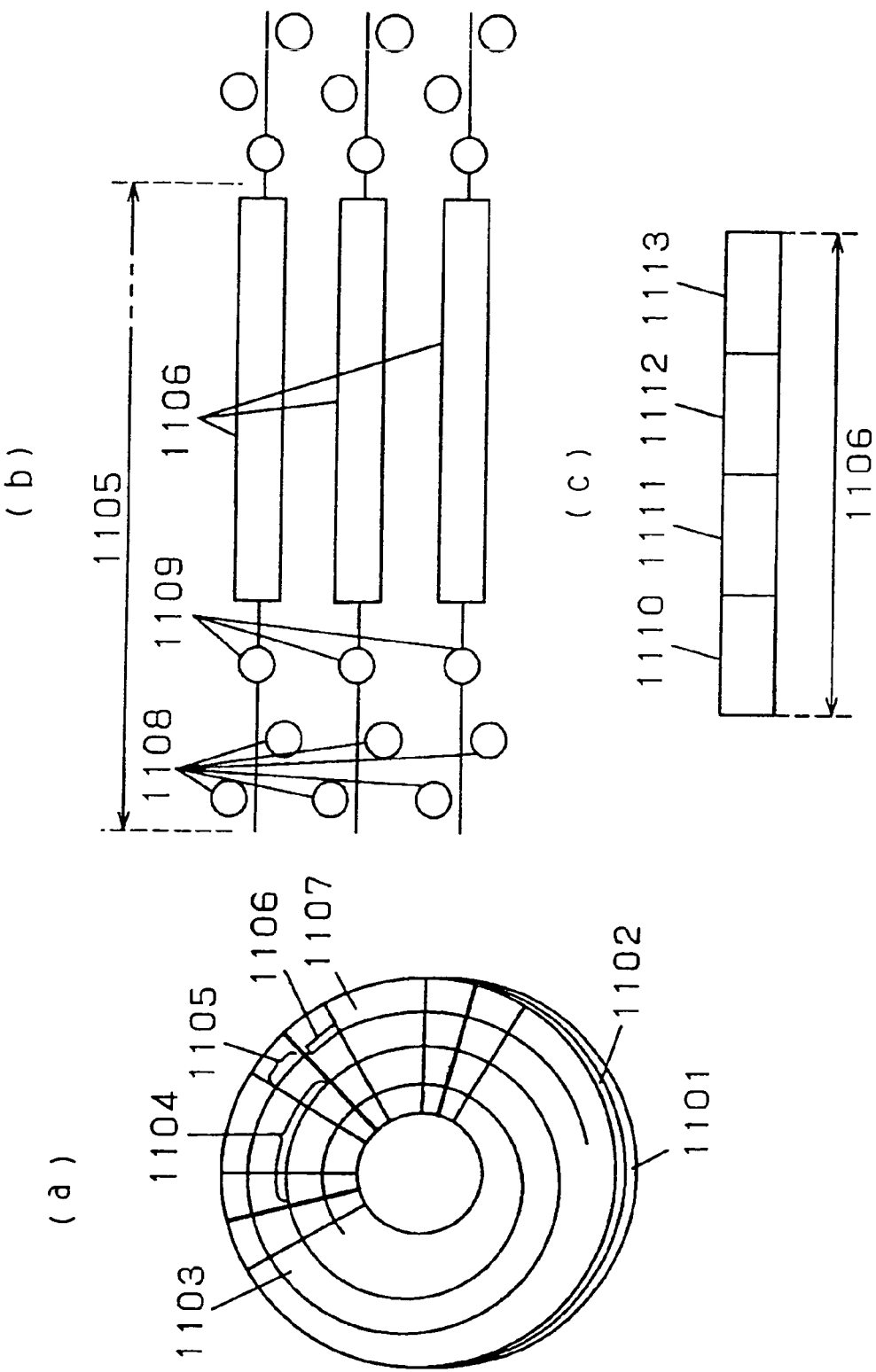
FIGS. 13(a), 13(b), and 13(c) are a general structural drawing, a drawing of a segment structure, and a drawing illustrating an address area, respectively, of another conventional optical disk.

In the conventional optical disk, as shown in FIG. 12, a detection pit (a polarity inversion mark) 1008 for polarity inversion is provided in the part where a track with one polarity shifts to that with the other polarity, and using this pit as a reference, the tracking polarity is switched. In the present embodiment, without using this polarity-inversion detection pit, the tracking polarities of the first track 503 and the second track 504 can be switched.

Figure 5:
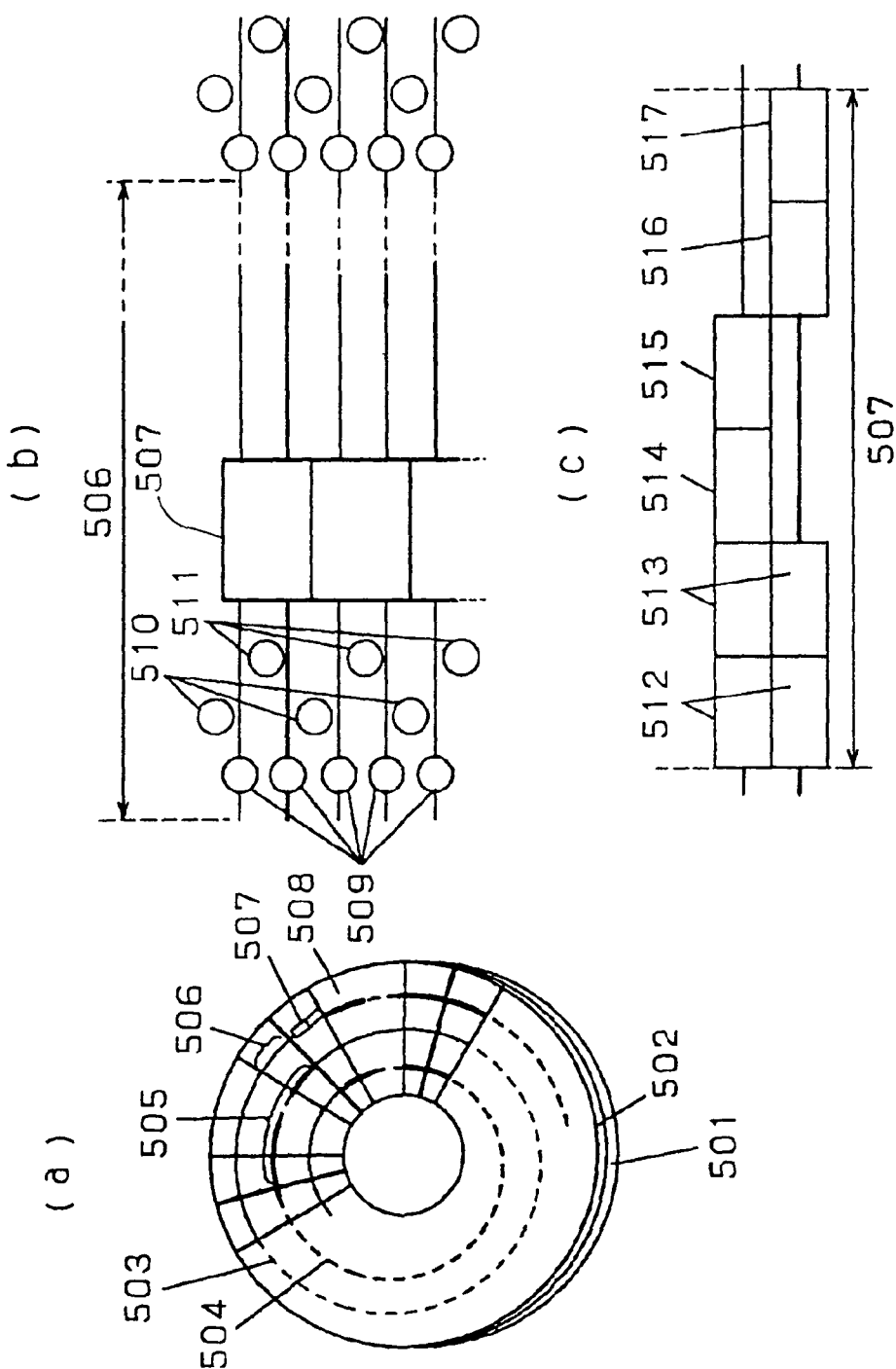
FIGS. 5(a), 5(b), and 5(c) are a general structural drawing, a drawing of a segment structure, and a drawing illustrating an address area, respectively, of an optical disk according to a second embodiment of the present invention.

As shown in FIG. 5(c), the address 507 in the present embodiment includes an 8-bit sector number 512, a sector-number error detection code 513, a track number 514 for the first track 503, an address-data error detection code 515 for the first track 503, a track number 516 for the second track 504, and an address-data error detection code 517 for the second track 504. As in the first embodiment, the error detection code 513 is added to a data (the sector number 512 in the present embodiment) common to adjacent tracks, and the pits of the address 507 are arranged as shown in FIG. 5, which are important characteristics of the present invention.

As shown in FIG. 5, data 512 and 513 common to tracks adjacent in a radial direction of the disk are recorded at the same positions in the first track 503 and the second track 504 and data 514 and 515 and data 516 and 517 are not common to adjacent tracks and are arranged at different positions. According to this positioning, the sector number 512 and the error detection code 513 are positioned with a high density in the radial direction of the disk and also are the data common to adjacent tracks. Therefore, reproduction can be performed without tracking control. In this case, the pitch of tracks adjacent in the radial direction of the disk is set so that, for example, the interval between the center of an address pit and that of the address pit adjacent thereto is around half the breadth of a beam spot or less. The use of such characteristics enables the process of inverting a tracking polarity at the boundary between the first track 503 and the second track 504. This method is described with reference to FIG. 7.

Figure 7:
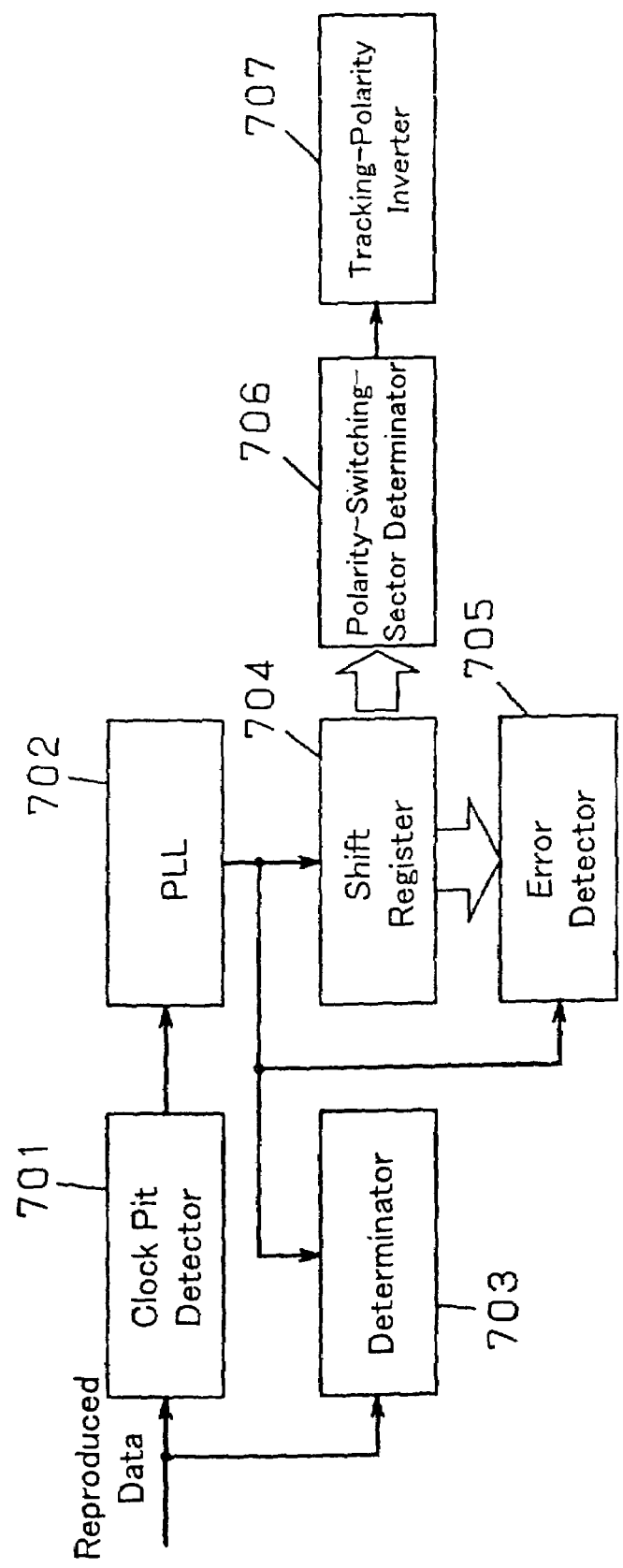
FIG. 7 is a block diagram of a tracking-polarity detector in the case of using the optical disk according to the second embodiment of the present invention.

FIG. 7 is a block diagram of a tracking polarity detector in the present embodiment. In FIG. 7, numeral 701 is a clock pit detector, numeral 702 a PLL for generating a clock for address demodulation based on the clock pit 509, numeral 703 a determinator for determining "1" and "0" of the address data in the trailing end of the PLL clock, numeral 704 a 16-bit shift register capable of storing the 8-bit sector number 512 and the 8-bit sector-number error detection code 513, and numeral 705 a CRC error detector for detecting an error in contents of the shift register 704, which are configured as in the first embodiment. In order to invert the tracking polarity, besides the above-mentioned configuration, the present embodiment further includes a polarity-switching-sector determinator 706 for detecting, from the sector number read out, the sector in which the polarity switches over and a tracking-polarity inverter 707.

As described above, the sector number 512 and the sector-number error detection code 513 accompanying the sector number can be reproduced in a tracking-off state. As in the first embodiment, it can be confirmed by the error detector 705 that the sector number has been read out correctly. It is determined by the polarity-switching-sector determinator 706 that the sector number read out correctly indicates the sector in which the tracking polarity is switched, thus switching (inverting) the tracking polarity by the tracking polarity inverter 707. As described above, according to the optical disk of the present embodiment, the position where the tracking polarity switches over can be detected before the tracking operation.

In a system of switching the tracking polarities by detecting a polarity-switching pit in a conventional optical disk, the tracking-polarity switching position is detected only when the tracking operation is performed. Therefore, there has been a problem that the tracking in the vicinity of the tracking-polarity switching position cannot be pulled in stably. In the optical disk according to the present embodiment, however, as described above, the tracking-polarity switching position is detected before the tracking pull-in operation, thus achieving constantly a stable tracking pull-in operation. The address 507 in the present embodiment can be demodulated by the same method as in the first embodiment.

In the present embodiment, the above description was directed to the configuration in which the sector number determined by the error detector 705 as being read out correctly is determined by the polarity-switching-sector determinator 706 as being the sector in which the tracking polarity switches over, and the tracking polarities are switched (inverted) by the tracking polarity inverter 707. In addition to such a configuration, for instance, it also is possible to configure the optical disk so that the length and number of clock marks are varied every revolution to detect the tracking-polarity switching position by detecting the characteristics of the clock marks. This enables the polarity to be confirmed in all the segments, thus allowing the tracking-polarity switching positions to be detected more stably at a higher speed.

Third Embodiment

Figure 8:
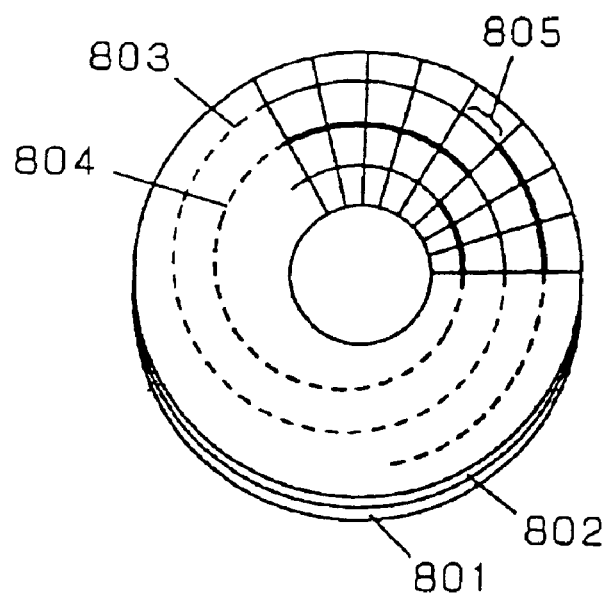
FIGS. 8(a) and 8(b) are a general structural drawing and a drawing of a segment structure, respectively, of an optical disk according to a third embodiment of the present invention.
Figure 8:
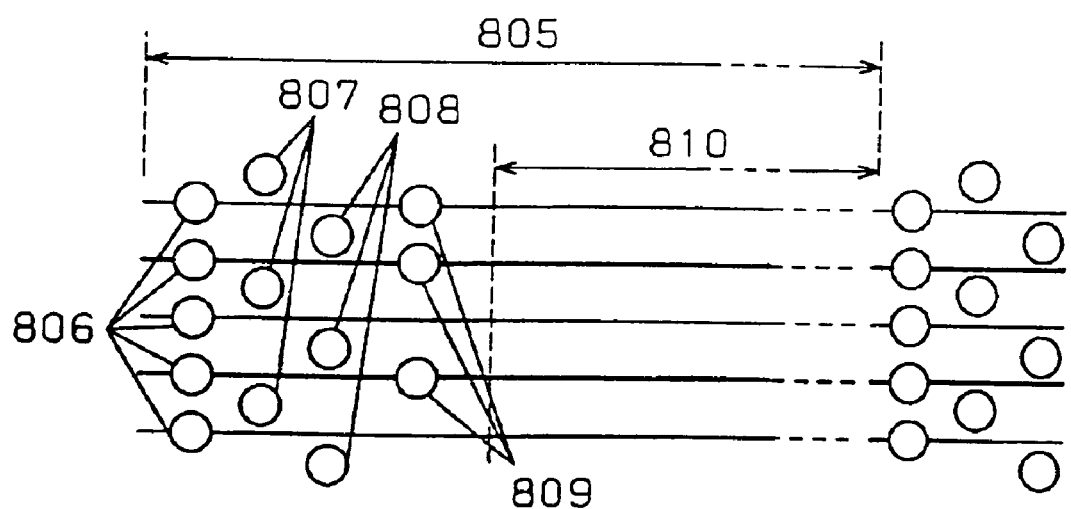

FIG. 8(a) and FIG. 8(b) show a general structure and a segment structure, respectively, of an optical disk according to a third embodiment of the present invention.

In FIG. 8(a), numeral 801 indicates a substrate, numeral 802 a recording film, numeral 803 a first track, numeral 804 a second track, and numeral 805 a segment obtained by dividing the tracks into 1280 segments. As shown in FIG. 8(b), in the leading location of the segment 805, a clock pit 806 for generating a clock, a pair of wobble pits 807 and 808 used for obtaining a tracking signal, and an address pit 809 arranged so that the address data are distributed to be positioned as one bit each. The tracking system in the present embodiment is the single-spiral polarity switching type sample servo system as in the second embodiment.

In the present embodiment, the address data is decomposed into one-bit data to be arranged in the segments 805, which is an important characteristic. In the first and second embodiments, the CRC error detector 205 or 705 is required to perform the shifting operation for 16 times during a one-bit shift of the shift register 204 or 704. Therefore, a high-speed clock is required, and it has been difficult to increase the address transfer rate. In the present embodiment, however, when the address pits 809 are distributed and arranged in the segments 805, time margin is obtained between reproduction of one bit of an address pit 809 and the reproduction of the subsequent address pit 809. During the time margin, the error detector can operate and therefore the system can be operated at a high speed. In addition, all the segments 805 have the same physical structure, and therefore the flexibility of the format can be improved considerably.

Figure 9:
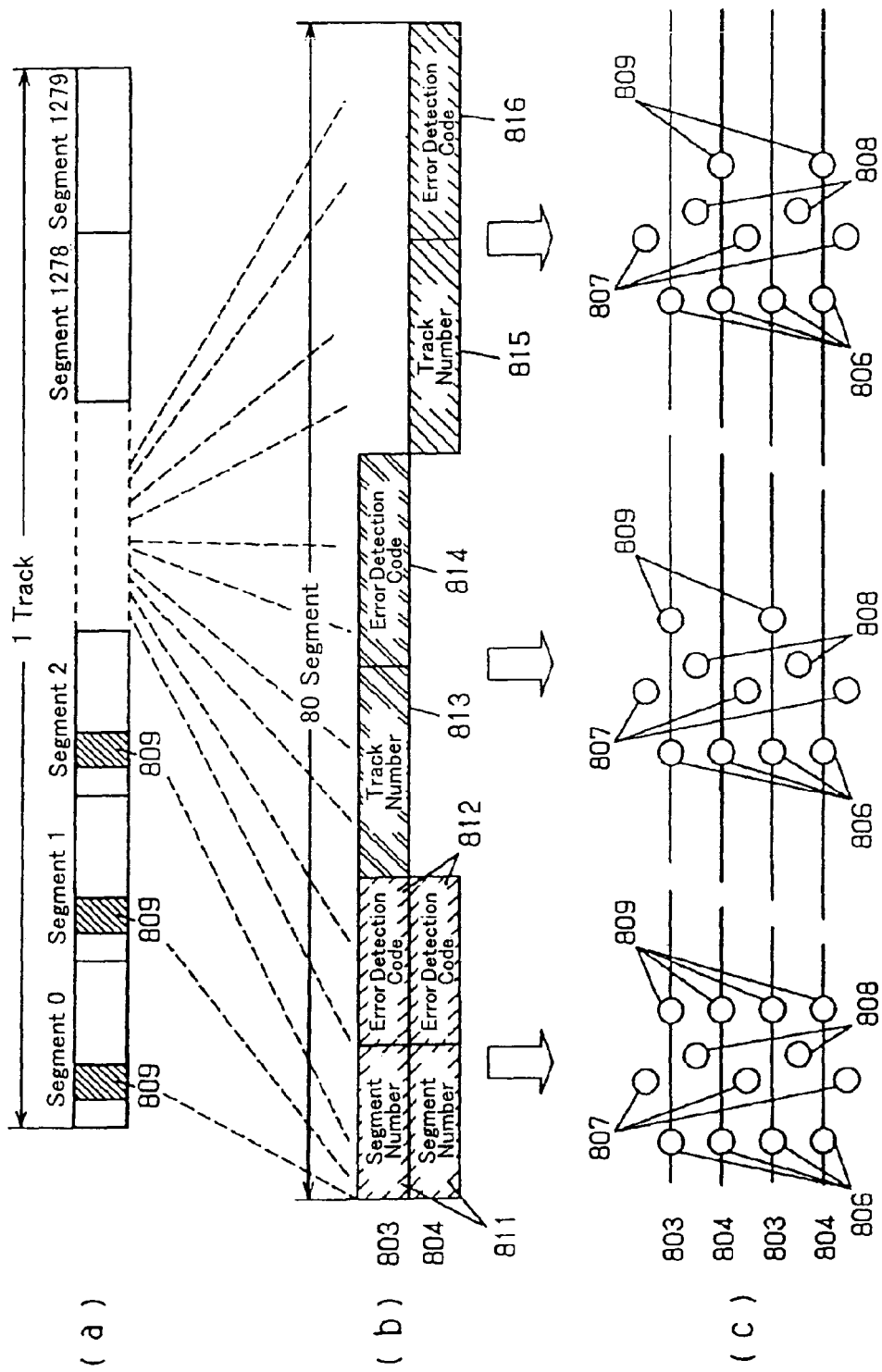
FIGS. 9(a), 9(b), and 9(c) are drawings illustrating data positions in an address part of the optical disk according to the third embodiment of the present invention.

The configuration of the address data according to the present embodiment is described in detail with reference to FIG. 9. In FIG. 9, numeral 811 indicates a segment number, numeral 812 an error detection code for detecting an error in the segment number 811, numeral 813 a track number of the first track 803, numeral 814 an error detection code for the track number 813, numeral 815 a track number of the second track 804, and numeral 816 an error detection code for the track number 815.

As shown in FIG. 9, a set of address data is produced by gathering the address pits 809 in 80 segments. Since one track has 1280 segments, 16 sets of address data can be produced per track. In the first and second embodiments, an error detection code was added to a sector number as data common to adjacent tracks. In the present embodiment, one corresponding to the sector number is the segment number 811. As shown in FIG. 9, the segment number 811 as data common to adjacent tracks and the error detection code 812 for the segment number 811 are recorded in both the first track 803 and the second track 804 and can be read out without tracking control. Thus, as in the second embodiment, the segment number can be detected in a tracking-off state and the process of inverting the tracking polarity also can be achieved.

As shown in FIG. 9, the track number 813 and the error detection code 814 for the track number 813 in the first track 803 and the track number 815 and the error detection code 816 for the track number 815 in the second track 804 are arranged so that the address pits 808 are not present in both adjacent tracks. This is intended to reduce errors due to crosstalk between adjacent tracks in reading out the address. Similarly in the present embodiment, when the address pits 809 in the segments 805 are gathered, the same format as in the first embodiment is obtained. Therefore, the address can be synchronized and demodulated by the same method as in the first embodiment, thus obtaining the same effects as in the first embodiment.

Fourth Embodiment

FIGS. 10(a) and 10(b) show a general structure and a segment structure, respectively, of an optical disk according to a fourth embodiment of the present invention. The fourth embodiment is different from the third embodiment with respect to the clock pit 806 and the tracking system.

Figure 10:
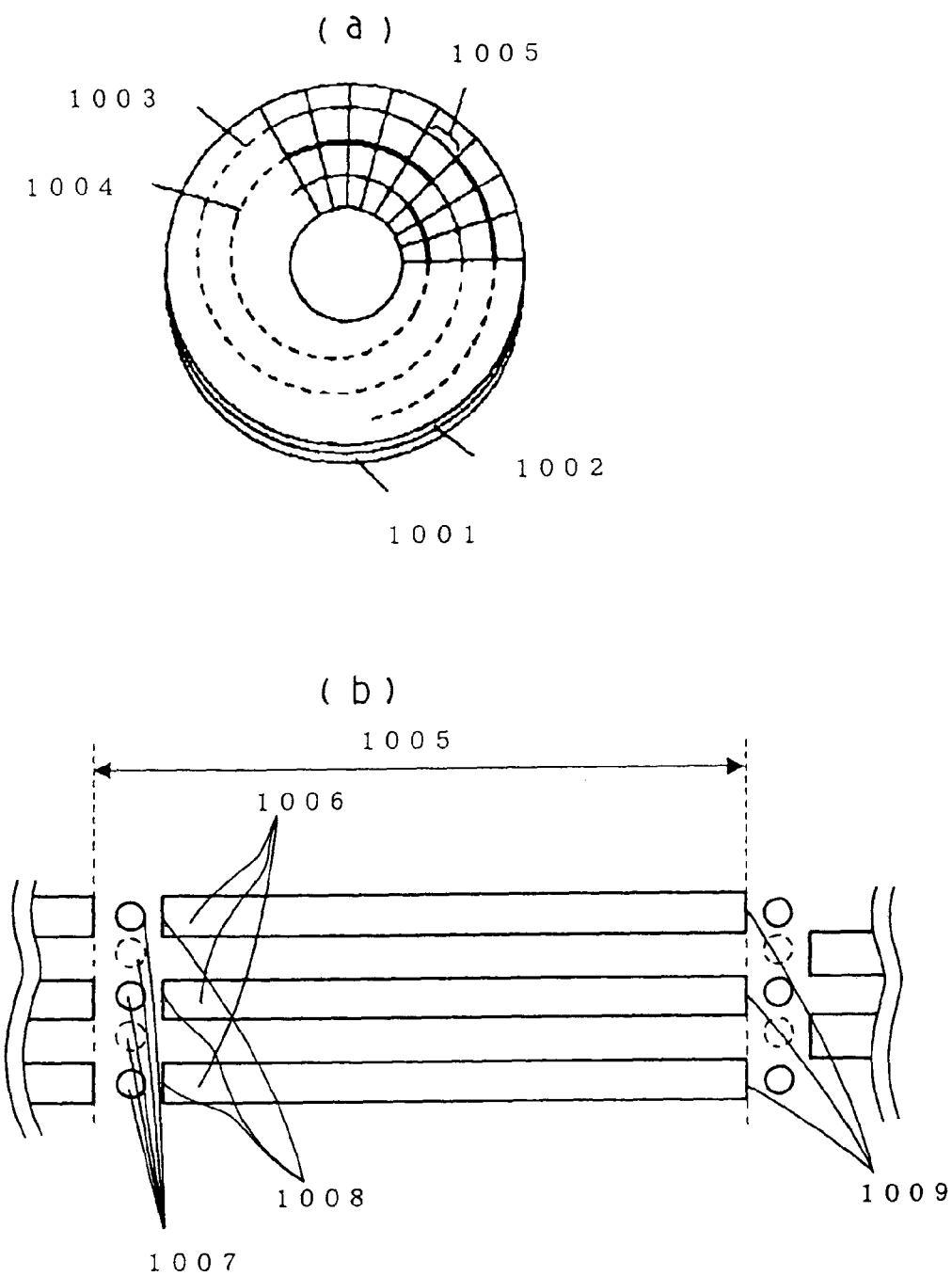
FIGS. 10(a) and 10(b) are a general structural drawing and a drawing of a segment structure, respectively, of an optical disk according to a fourth embodiment of the present invention.

In FIG. 10, numeral 1001 indicates a substrate, numeral 1002 a recording film, numeral 1003 a first track, numeral 1004 a second track, and numeral 1005 a segment obtained by dividing tracks into 1280 segments. The first track 1003 is formed of inter-groove portions separated, segment 1005 by segment 1005. The second track 1004 is formed of grooves separated, segment 1005 by segment 1005. These two tracks are arranged alternately on a one-revolution basis with a land/groove single spiral structure.

FIG. 10(b) shows an enlarged view of the segments 1005. The area for recording data includes grooves 1006 and inter-groove portions between the grooves 1006. The grooves 1006 are separated, segment 1005 by segment 1005. Address pits 1007 are positioned in the separated grooves and inter-groove portions. Leading end positions 1008 or trailing end positions 1009 of the grooves 1006 of the data recording area are aligned radially and serve as clock position information. This has the same function as that of the clock pit in the third embodiment.

In the present embodiment, the trailing ends 1009 are used as clock position information. However, the leading ends 1008 also may be used as the clock position information.

The tracking system in the present embodiment is a single-spiral polarity switching type groove tracking system using the intensity of diffracted light and reflected light from the grooves 1006. Similarly in this system, the address pits 1007 can be demodulated by the PLL clock extracted from the clock position information 1009. Therefore, in the tracking polarity switching system and the address demodulation system, the same effects as in the second and third embodiments can be obtained. Furthermore, the address format obtained by gathering the address bit data 1007 is equivalent to that in the third embodiment, and the effects equivalent to those in the third embodiment can be obtained.

Fifth Embodiment

FIGS. 11(a) and 11(b) show a general structure and a segment structure, respectively, of an optical disk according to a fifth embodiment of the present invention. The fifth embodiment is different from the third embodiment with respect to the forms of the clock pits 806 and the address pits 809.

Figure 11:
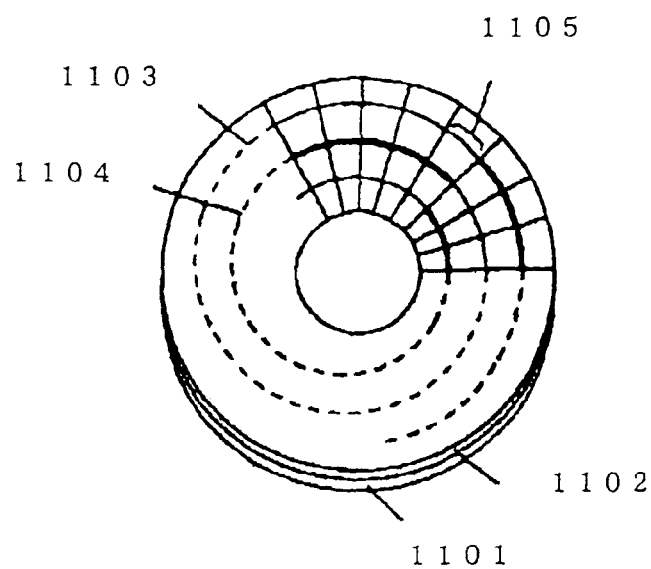
FIGS. 11(a) and 11(b) are a general structural drawing and a drawing of a segment structure, respectively, of an optical disk according to a fifth embodiment of the present invention.
Figure 11:
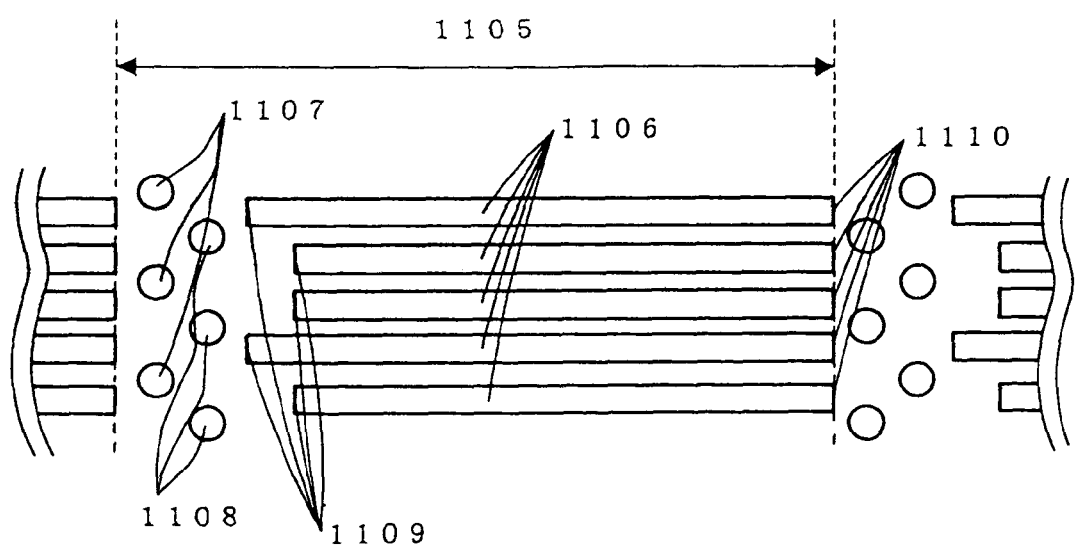

In FIG. 11, numeral 1101 indicates a substrate, numeral 1102 a recording film, numeral 1103 a first track, numeral 1104 a second track, and numeral 1105 a segment obtained by dividing the tracks into 1280 segments. As shown in FIG. 11(b), in the segments 1105, grooves 1106 as areas for recording data and pairs of wobble pits 1107 and 1108 used for obtaining tracking signals are positioned. The leading end positions 1109 of the grooves 1106 as the data recording areas are shifted corresponding to address data "1" and "0". According to this, the address data are distributed to be positioned in the segments 1105 as one bit each. The leading end positions 1109 of the grooves 1106 have a function equivalent to that of the address pits in the third embodiment. In addition, trailing end positions 1110 of the grooves 1106 are aligned and serve as clock position information. This has the same function as that of the clock pits in the third embodiment.

In the present embodiment, the leading ends 1109 were used as address bit data and the trailing ends 1110 as the clock position information. Conversely, however, the leading ends 1109 may be used as the clock position information and the trailing ends 1110 as the address bit data.

However, the present embodiment provides a shorter interval between the clock detection reference positions 1110 of the trailing ends of the grooves 1106 and the leading end positions 1109 of the grooves 1106 corresponding to the address bits "1" and "0". Jitter precision of the clock extracted from the trailing end positions 1110 is degraded with the distance from the trailing end positions 1110. The address demodulated using this clock also is affected by the jitter. Therefore, the nearer the position of the address bit is to the trailing end positions 1110 as the position reference of the clock, the higher the address detection precision becomes, thus decreasing the error rate. For the above-mentioned reasons, better effects can be obtained when the leading end positions 1109 are used as the address bit data and the trailing end positions 1110 as the clock position information.

The tracking system in the present embodiment is the single-spiral polarity switching type sample servo system as in the second and third embodiments. Therefore, in tracking control, the effect equivalent to that in the second and third embodiments can be obtained.

The address format obtained by gathering the address bit data 1109 is equivalent to that in the third embodiment. Therefore, the effect equivalent to that in the third embodiment can be obtained.

Furthermore, in the present embodiment, the area for recording data is formed of the grooves 1106. Usually, in an optical disk in which recording is carried out only in grooves or only in inter-groove portions through tracking performed using the grooves as a guide, the limit of the tracking control information obtained from the grooves is about 1.2 times half the breadth of an optical beam. In order to overcome this limit, a land/groove system is employed, in which recording is carried out in both grooves and inter-groove portions. However, the cross-sectional structures of the tracks are different in the grooves and the inter-groove portions. Therefore, the grooves and the inter-groove portions have different recording/reproducing characteristics, which has been a big problem. This difference in the characteristics has been a bigger problem in superresolution reproduction, requiring a complicated operation of a recording/reproducing film for a reproduction operation, represented by a front aperture system, an in-plane vertical center aperture system, a double mask system, a domain wall motion system, or the like.

In the present embodiment, however, the tracking control is performed according to the signals obtained from the wobble pits 1107 and 1108 while recording and reproduction are carried out only in the grooves. Therefore, a track pitch of 1.2 times half the breadth of an optical beam or less can be achieved, which was difficult conventionally.

As described above, the present embodiment enables the track pitch to be reduced and the difference in recording/reproducing characteristics between tracks to be eliminated simultaneously.

The embodiments of the present invention were described using sector numbers and segment numbers as examples of the data common to adjacent tracks. However, the present invention is not limited to this. In an optical disk, employing a ZCLV or ZCAV system, divided into zones in a radial direction, the common data include zone numbers in the zones, zone constructional information required for the reproduction of the zones, security information for the reproduction of the optical disk, and the like.

Furthermore, the embodiments of the present invention were described using an optical disk as an example of a disk-shaped storage medium. However, the present invention also can be applied to, for instance, a magneto-optical data file (MO) and a phase change type disk (PD, DVD-RAM) in which recording and reproduction can be carried out, a ROM disk used exclusively for reproduction, a recording/reproduction disk for music (for example, MD), or the like.

What is claimed is:

1. An address reproduction method, comprising:
   reading from and writing to a disk-shaped storage medium that includes adjacent tracks having starting ends and trailing ends, the tracks being divided into a plurality of areas with address data positioned in the plurality of areas of each track, address data of one track having data common to address data of the adjacent track, and the tracks including reference positions for producing timings for demodulation of the address data from the starting ends or trailing ends of the tracks.

2. The method of claim 1, further comprising distributing the address data in the plurality of areas as one bit each.

* * * * *